United States Patent [19]

Le Gac et al.

[11] Patent Number: 5,759,454
[45] Date of Patent: Jun. 2, 1998

[54] METHOD OF INJECTING A FILLER IN CONTROLLED MANNER INTO A PROTECTIVE TUBE FOR PROTECTING OPTICAL FIBERS, AND AN INSTALLATION FOR IMPLEMENTING THE METHOD

[75] Inventors: Renaud Le Gac, Calais; Jean-Francois Libert, Pont de Briques, both of France

[73] Assignee: Alcatel Submarcom, Clichy, France

[21] Appl. No.: 682,964

[22] Filed: Jul. 18, 1996

[30] Foreign Application Priority Data

Jul. 20, 1995 [FR] France ................... 95 08806

[51] Int. Cl.⁶ .................................................. B29D 11/00
[52] U.S. Cl. .................. 264/1.28; 228/148; 228/9; 264/40.1; 425/114; 425/135
[58] Field of Search .................... 264/40.1, 40.4, 264/40.6, 1.24, 1.27, 1.28, 1.29; 425/135, 140, 143, 114, 113; 228/148, 9

[56] References Cited

U.S. PATENT DOCUMENTS

| | | | |
|---|---|---|---|
| 4,479,702 | 10/1984 | Pryor et al. ............... | 264/1.28 |
| 4,508,423 | 4/1985 | Winter et al. . | |
| 4,554,116 | 11/1985 | Cooke ......................... | 264/1.29 |
| 5,143,274 | 9/1992 | Laupretre et al. . | |
| 5,395,557 | 3/1995 | Griser et al. .................. | 264/1.28 |

FOREIGN PATENT DOCUMENTS

| | | | |
|---|---|---|---|
| 3504751A1 | 8/1986 | Germany . | |
| 64-68649 | 3/1989 | Japan ....................... | 264/40.1 |
| 5-50491 | 3/1993 | Japan ....................... | 264/40.1 |
| 2193450 | 2/1988 | United Kingdom . | |
| WO9101506 | 2/1991 | WIPO . | |

OTHER PUBLICATIONS

Patent Abstracts of Japan, vol. 010, No. 052 (P–432), 28 Feb. 1986 corresponding to JP–A–60 195508 (Showa Densen Denran KK) dated 4 Oct. 1985.

*Primary Examiner*—Mathieu D. Vargot
*Attorney, Agent, or Firm*—Sughrue, Mion, Zinn, Macpeak & Seas, PLLC

[57] ABSTRACT

A method of injecting a filler in controlled manner into a protective tube for protecting optical fibers, the method consisting in regulating the delivery rate of the filler being injected as the closed tube advances. In the method, the delivery rate is regulated by detecting the position of the front of the filler contained in the protective tube relative to at least one detection point on the line for advancing the closed protective tube.

12 Claims, 1 Drawing Sheet

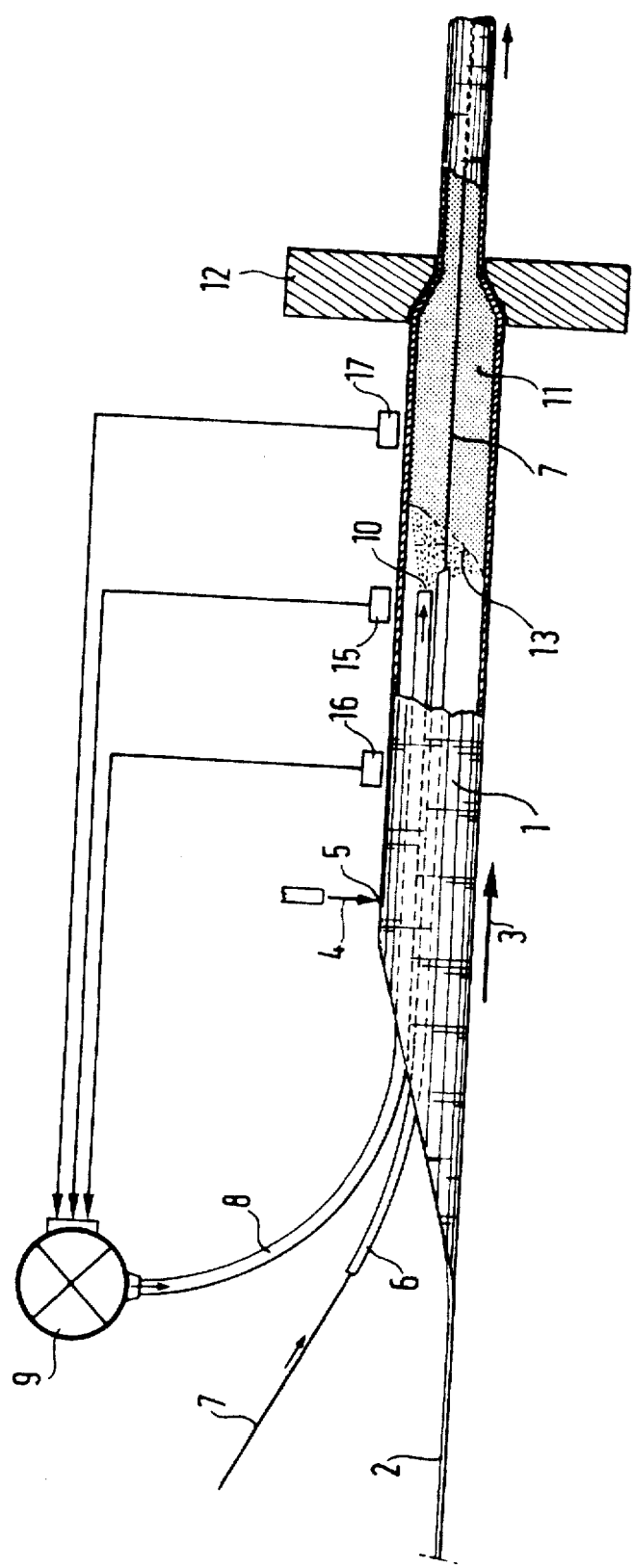

METHOD OF INJECTING A FILLER IN CONTROLLED MANNER INTO A PROTECTIVE TUBE FOR PROTECTING OPTICAL FIBERS, AND AN INSTALLATION FOR IMPLEMENTING THE METHOD

The present invention relates to manufacturing an optical fiber cable, or an optical module of such a cable. It relates more particularly to a method of injecting a filler in controlled manner into a protective tube for protecting optical fibers, during manufacture of the optical fiber cable or module, and to an injection installation implementing the method.

BACKGROUND OF THE INVENTION

It is well known that, when optical fibers are put into a protective tube, a surplus length of fiber is generally left on each fiber in the tube, and the fibers are often embedded in a filler filling the tube. The tube may be made of metal or of plastic depending on the application in question, and the overall structure of the cable may be that of an under-sea cable, a buried cable, an overhead cable, or some other type. The filler is a viscous substance, e.g. a jelly or a grease, or some other suitable damping substance for holding the fibers and/or preventing any ingress of water from advancing inside the tube.

Document U.S. Pat. No. 4,508,423 describes manufacture of an optical fiber module in which the optical fibers are put into a metal protective tube, and they are embedded in a filler. The tube is made from a metal strip deformed into a tube, and it is closed by laser welding, as it advances. The fibers are inserted into the protective tube by means of a guide tube engaged in the protective tube prior to closure thereof, and extending inside the protective tube beyond the laser welding point. The filler is injected under pressure via an injection duct which also extends beyond the welding point.

Document GB-A 2 193 450 describes manufacture of an analogous optical fiber module in which the protective tube is made of plastic and it is extruded around the fibers. As the tube is being extruded, the filler is simultaneously injected via an injection head which is coupled to the extrusion die, and which is provided with an injection channel opening out in the extrusion zone. A pressure sensor in the injection head controls the quantity of filler that is delivered to it by a pump, so as to increase said quantity if the detected pressure decreases, and to reduce said quantity if the detected pressure increases.

In those known modules, the protective tube for protecting the fibers is never completely filled with the filler. Such incomplete filling results firstly from variations in the inside dimensions of the tubes and/or from variations in the volume occupied by the fibers received in each tube, and secondly from the need to avoid risks of the injected filler flowing back to the region in which the metal tube is being laser welded, or likewise flowing back to the region upstream from the extrusion zone of the tube made of plastic, so as not to interfere with the operation in question.

Consequently, it is common practice for the target filling level to be not more than 91%. This maximum target level results in a real filling level being achieved that varies, that lies in the range 85% to 97%, and that is therefore not always satisfactory for the filler to perform its functions fully.

Document WO-A-9101506 also proposes to regulate the delivery rate at which the filler is injected into the welded metal protective tube for protecting the fibers. The delivery rate is regulated by measuring the pressure of an inert gas fed into the tube via a feed pipe juxtaposed with the filler injection pipe, and opening out upstream thereof. Any sudden increase in the gas pressure in the feed pipe indicates that its end is blocked by the injected filler, and causes the delivery rate of the injected filler to be reduced. Any subsequent sudden decrease in the measured gas pressure causes the delivery rate of the injected filler to be increased. That mode of regulation suffers from several drawbacks. In particular, it requires a gas feed pipe to be disposed inside the welded metal tube even though there is very little space available inside said tube, or the gas to be channeled through the capillary tube for guiding the fibers, thereby enabling the gas to escape upstream, and possibly interfering with the controlled advance of the fibers. Furthermore, it requires the feed pressure of the gas to be chosen suitably, and this seems difficult to do. If the feed pressure is not high enough, the filler can block the end of the gas feed pipe permanently. Conversely, if the feed pressure is too high, the filler cannot block the end of the gas feed pipe at all, it can give rise to eddies going towards the welding point, and it can also trap gas bubbles. In either case, there is a risk of the system becoming "blind" so that it does not regulate the delivery rate of the injected filler as desired, and so that it gives rise to other interference or defects.

OBJECTS AND SUMMARY OF THE INVENTION

An object of the present invention is to ensure that the protective tube for protecting the fibers is filled completely or almost completely, while avoiding the above-mentioned risks when injecting the filler.

The present invention provides a method of injecting a filler in controlled manner into a protective tube for protecting optical fibers, during leak-tight closure of the tube at a closure point on a line for advancing said tube and putting the fibers into said tube, the method consisting in regulating the delivery rate of the filler being injected into said tube, at an injection point situated downstream from the closure point, on the basis of a detection signal generated by detecting the position of the front of the filler contained in said tube relative to a first detection point situated downstream from the closure point, said method consisting in measuring a specific physical property at the first detection point, which property varies with the position of the front of the filler and is exhibited by one of the two elements defined by said tube and by said filler contained in said tube, so as to detect the position of the front of the filler relative to said first detection point.

The present invention also provides an installation for implementing the method, and comprising said line provided with means for putting the fibers into said protective tube, with injection means having an adjustable delivery rate for injecting the filler into said protective tube, and with delivery-rate regulation means for regulating said delivery rate, wherein said delivery-rate regulation means comprise a sensor responsive to said property, mounted at each detection point, and connected to said injection means.

In particular:
each sensor is mounted outside and facing the protective tube, or inside the protective tube; and
each sensor is responsive to the temperature of the protective tube, at the detection point in question, or to an effect due to the filler itself.

BRIEF DESCRIPTION OF THE DRAWING

The characteristics and advantages of the invention appear from the following description given with reference to the accompanying drawing, in which the sole FIGURE diagrammatically and by way of example shows an installation of the invention for putting optical fibers into a protective tube, and injecting a filler into said protective tube in controlled manner.

MORE DETAILED DESCRIPTION

In this example, the protective tube 1 is made of metal. It is made in known manner from a metal strip 2 which is progressively deformed into a tube that is itself then hermetically closed by being laser welded, on a line defined by the strip and by the resulting closed tube. Arrow 3 indicates the advance of the strip and of the closed tube, arrow 4 indicates the hermetic or leak-proof closure of the tube, and reference 5 indicates the closure point at which the tube advancing along the line is closed.

Prior to being closed, the protective tube receives a guide tube 6 for guiding optical fibers 7, and an injection tube 8 for injecting a filler. The guide tube 6 and the injection tube 8 extend inside the protective tube beyond the closure point at which it is closed. An injection pump 9 is coupled to the injection tube 8, and it delivers the filler that is injected into the protective tube. The pump has a controlled variable delivery rate. That end of the injection tube which is inside the protective tube constitutes the injection point 10 at which the filler is injected.

The metal protective tube 1, which is closed and which contains the fibers 7 and the injected filler 11, can then have its cross-section reduced as it advances by passing through a cross-section reducing station shown at 12 but optional in the installation.

According to the invention, the delivery rate of the injection pump 9 is controlled by detecting the front or upstream end 13 of the filler 11 contained in and filling the protective tube. The detection is performed as the filler is being injected and as the protective tube is advancing, at at least one detection point 15 along the line, so as to cause the delivery rate of the injection pump to be increased if the front of the filler has not reached said detection point, and is therefore downstream thereof, and so as to cause said delivery rate to be reduced if the front of the filler reaches the detection point 15 and goes upstream therebeyond.

Said detection point 15 is shown situated at the same level as the injection point 10, but it could equally well be situated upstream or downstream from the injection point, while remaining at an appropriate distance from the injection point so as to avoid making the installation any longer, so as to facilitate detection of the front of the filler, and so as to avoid incompletely filling the protective tube or risks of interfering with the laser welding operation. In any event, the detection point is upstream from the cross-section reducing station 12 and downstream from the closure point 5, while being situated at at least a minimum safety distance therefrom so as to ensure that the filler cannot reach the closure point, and so as to allow for a detection and response time long enough to cause the delivery rate of the pump to be reduced.

Detecting the position of the front of the filler relative to the detection point 15 is advantageously supplemented by detecting it at a second detection point 16 upstream from the first detection point 15. Detecting the front at detection point 16 constitutes "safety" detection which is performed downstream and at a distance of not less than about 10 cm from the closure point 5, and which corresponds to maximum filling being reached but indicates a risk of surplus filler being injected, and forces a reduction in the delivery rate. Such safety detection may be associated with the detection at detection point 15 so as to maintain the delivery rate at a constant value if the front lies between the two detection points.

In comparable manner, detecting the front may be supplemented by detecting it at a third detection point 17 downstream from point 15. Such supplementary detection also constitutes safety detection which indicates a risk of the tube not being completely filled due to too low a delivery rate of the injected filler, and which forces an increase in the delivery rate of the injection pump 8.

The position of the front of the filler contained in the tube 1 is detected at each detection point by a sensor which is mounted at the detection point in question. Each sensor is responsive to the presence of the filler thereat, or to one of the properties of the filler, and it is connected to the injection pump so as to control the delivery rate thereof.

Each sensor 15, 16, 17 is preferably mounted outside the protective tube, facing said tube and at a short distance therefrom. In a variant, it may be mounted inside the protective tube, and it is then carried by the injection tube 8, by the guide tube 6, or by a suitable auxiliary support.

Each sensor is preferably a temperature sensor which detects the temperature of the protective tube so as to indicate the presence or the absence of the filler filling the protective tube to its level. It is advantageously mounted facing the closure generator line along which the metal protective line is closed. Although optionally cooled after it has been closed by laser welding, the tube retains a certain temperature after closure, in particular on its closure generator line and in the immediate vicinity thereof.

The temperature of the closed protection tube falls due to the presence of the filler in contact with the inside of the closure generator line, so that a variation in the temperature of the protective tube at the detection point indicates that the protective tube is filled to the level of said point. Conversely, the temperature increases again when the protective tube is no longer filled to said level.

In a variant, each sensor may be constituted by a capacitive detector or by a detector of some other suitable type which is responsive to the properties or to the nature of the filler in the protective tube, or to a side effect due to the filler in the protective tube and such as the temperature of the tube. The type of sensor used and its inside or outside mounting mode are chosen as a function of the mode of making and/or closing the protective tube which is metal and is closed by laser welding in the example described, but which could equally well be made of plastic and be extruded so that it is closed directly as from the starting point of its extrusion on the line on which it is made and along which it advances.

We claim:

1. A method of injecting a filler in controlled manner into a protective tube for protecting optical fibers, during leak-tight closure of the tube at a closure point on a line for advancing said tube and putting the fibers into said tube, the method comprising regulating the delivery rate of the filler being injected into said tube, at an injection point situated downstream from the closure point, on the basis of a detection signal generated by detecting the position of an upstream end of the filler contained in said tube relative to a first detection point situated downstream from the closure point, and further comprising measuring a specific physical property at the first detection point, which property varies with the position of the upstream end of the filler and is exhibited by one of two elements defined by said tube and by said filler contained in said tube, so as to detect the position of the upstream end of the filler relative to said first detection point.

2. A method according to claim 1, wherein said first detection point is substantially level with said injection point.

3. A method according to claim 1, further comprising detecting the upstream end of the filler in the protective tube at a second detection point situated upstream from said first detection point and downstream from said closure point on said line, by measuring said property at said second detection point, so as to reduce the delivery rate if the upstream end of the filler is detected at the second detection point.

4. A method according to claim 1, comprising detecting the upstream end of the filler in said tube at a third detection point situated downstream from said first detection point at a defined and limited distance therefrom on said line, by measuring said property at said third detection point, so as to increase the delivery rate if the upstream end of the filler is detected at said third point.

5. An installation for implementing a method of infecting a filler in controlled manner into a protective tube for protecting optical fibers, during leak-tight closure of the tube at a closure point on a line for advancing said tube and putting the fibers into said tube, the method comprising regulating the delivery rate of the filler being injected into said tube, at an injection point situated downstream from the closure point, on the basis of a detection signal generated by detecting the position of an upstream end of the filler contained in said tube relative to a first detection point situated downstream from the closure point, and further comprising measuring a specific physical property at the first detection point, which property varies with the position of the upstream end of the filler and is exhibited by one of two elements defined by said tube and by said filler contained in said tube, so as to detect the position of the upstream end of the filler relative to said first detection point, wherein said installation comprises means for putting the fibers into said protective tube, injection means having an adjustable delivery rate for injecting the filler into said protective tube, and delivery-rate regulation means for regulating said delivery rate, wherein said delivery-rate regulation means comprises a sensor responsive to said property, said sensor being mounted at said first detection point, and being connected to said injection means.

6. An installation according to claim 5, wherein said sensor is mounted outside said protective tube and facing said tube.

7. An installation according to claim 5, wherein said sensor is mounted inside said protective tube.

8. An installation according to claim 6, wherein said sensor is responsive to the temperature of said protective tube at said first detection point, and wherein the presence or absence of the filler in the protective tube at the level of said first detection point is determined in accordance with the difference between an output of said sensor when the filler is at the level of said first detection point and when the filler is not at the level of said first detection point.

9. An installation according to claim 6, wherein said sensor is responsive to an effect due to the filler itself.

10. An installation for injecting a filler in controlled manner into a protective tube for protecting optical fibers, during leak-tight closure of the tube at a closure point on a line for advancing said tube and putting the fibers into said tube, said installation comprising:

means for putting the fibers into said protective tube;

an injector having an adjustable delivery rate for injecting the filler into said protective tube; and means for regulating said delivery rate in accordance with a position of an upstream end of the filler relative to a detection point downstream from the closure point, said means for regulating said delivery-rate comprising means for measuring a specific physical property at said detection point, which property varies with the position of the upstream end of the filler and is exhibited by one of two elements defined by said tube and by said filler contained in said tube, so as to detect the position of the filler relative to said detection point.

11. An installation for injecting a filler in controlled manner into a protective tube for protecting optical fibers, during leak-tight closure of the tube at a closure point on a line for advancing said tube and putting the fibers into said tube, said installation comprising:

means for putting the fibers into said protective tube;

an injector having an adjustable delivery rate for injecting the filler into said protective tube; and a sensor connected to said injector, said sensor being disposed at a predetermined position along said tube downstream of the closure point, said sensor being responsive to a specific physical property at said detection point, said property varying with the position of an upstream end of the filler and being exhibited by at least one of the tube and the filler.

12. An installation for injecting a filler in controlled manner into a protective tube for protecting optical fibers, during leak-tight closure of the tube at a closure point on a line for advancing the tube and putting the fibers into the tube, said installation comprising:

means for injecting the filler in the protective tube; and means for controlling the delivery rate of the filler, said controlling means comprising:

means for detecting an upstream end of the filler at a detection point, said detecting means measuring a property of one of the tube and the filler in the tube.

* * * * *